United States Patent [19]

Shtipelman et al.

[11] Patent Number: 5,774,447
[45] Date of Patent: Jun. 30, 1998

[54] OPTICAL DISCS WITH COVER SHEETS AND DYNAMIC PRESSURE STABILIZATION OF THE ENCLOSED AIR

[75] Inventors: Boris A. Shtipelman, Rochester; James A. Barnard, Scottsville, both of N.Y.

[73] Assignee: Eastman Kodak Company, Rochester, N.Y.

[21] Appl. No.: 755,085

[22] Filed: Nov. 22, 1996

[51] Int. Cl.$^6$ .............................. G11B 7/24; G11B 33/14
[52] U.S. Cl. ........................................... 369/291; 369/283
[58] Field of Search ........................... 360/97.01, 97.02, 360/97.03, 97.04, 135; 369/289, 290, 291, 280, 283, 284, 286

[56] References Cited

U.S. PATENT DOCUMENTS

| | | | |
|---|---|---|---|
| 4,507,774 | 3/1985 | Marchant | 369/271 |
| 4,539,573 | 9/1985 | Marchant et al. | 346/137 |
| 4,720,826 | 1/1988 | Sugiyama et al. | 369/283 |
| 4,911,968 | 3/1990 | Higasihara et al. | 369/282 |
| 4,922,354 | 5/1990 | Edwards | 360/97.03 |
| 4,972,404 | 11/1990 | Yamaguchi et al. | 369/280 |
| 5,132,960 | 7/1992 | Hosokawa et al. | 369/280 |

FOREIGN PATENT DOCUMENTS

| | | | |
|---|---|---|---|
| 86065 | 8/1983 | European Pat. Off. | 369/280 |
| 57-154687 | 9/1982 | Japan | 360/97.03 |
| 60-229252 | 11/1985 | Japan | 369/280 |
| 60-261091 | 12/1985 | Japan | 360/97.03 |

Primary Examiner—Stuart S. Levy
Assistant Examiner—David L. Ometz
Attorney, Agent, or Firm—Raymond L. Owens

[57] ABSTRACT

An optical disc having a substrate in which data can be written on or read from, such optical disc being adapted to be inserted and clamped onto a spindle in a disc drive and having a transparent cover sheet disposed over the substrate surface. The optical disc has a perimeter ring on the edge thereof and a spacer formed adjacent to a central opening in the disc. The perimeter ring is formed with a plurality of air passages leading from the space between the transparent cover sheet and the substrate surface to the outside atmosphere and the spacer is formed with a plurality of air passages leading from the outside atmosphere to the space between the transparent cover sheet and the substrate surface. Filters are provided in the air passages in the spacer and the perimeter ring to prevent contaminants from the atmosphere from entering into the space between the transparent cover sheet and the substrate surface.

2 Claims, 7 Drawing Sheets

OPTICAL DISCS WITH COVER SHEETS AND DYNAMIC PRESSURE STABILIZATION OF THE ENCLOSED AIR

CROSS REFERENCE TO RELATED APPLICATIONS

The present invention is related to U.S. patent application Ser. No. 08/756,197, entitled "Air Sandwiched Optical Discs With Closeable Pressure Relief Holes", filed concurrently herewith, and U.S. patent application Ser. No. 08/755,747, entitled "Optical Discs With Cover Sheets and Pressure Equalization of the Enclosed Air", filed concurrently herewith, assigned to the assignee of the present invention. The disclosure of these related applications is incorporated herein by reference.

1. Field of the Invention

This invention relates to optical discs with cover sheets.

2. Background of the Invention

As with all information storage devices, the recording surface of an optical disc must be protected from dust, small particles, or any other source of contamination. Since optical drives use removable media, such a protection is usually incorporated in the disc design. For instance, the widely used compact discs of various formats incorporate a layer of transparent plastic to separate the recording surface from the outside world. Such a surface in a 355.6 mm in diameter optical disc is protected by a polycarbonate transparent cover sheet. The latter is radially tensioned and sealed to a spacer and a perimeter ring at the inner and outer radii of the disc, respectively. The space under the cover sheet is filled with air enclosed there during assembly of the disc. Obviously, the barometric pressure of air under the cover sheet (equal to the air pressure in the clean room during assembly) and the atmospheric pressure of air surrounding the disc during drive operation may have different values. This will create a pressure differential for the air inside and outside the disc resulting in deflection of the cover sheet.

Due to centrifugal forces during disc rotation, the air under the cover sheet will be displaced toward the outside periphery of the disc. This air motion will result in additional deflection of the cover sheet. Its original surface will be transformed into a more complicated shape that may result in catastrophic conditions when the cover sheet touches the objective lens (at the outer radius) or the substrate (at the inner radius). For examples of optical discs with cover sheets, see commonly assigned U.S. Pat. Nos. 4,507,774 and 4,539,573.

Referring to FIGS. 1 and 2, a prior art two-sided optical disc has a substrate 10 which is protected from the outside world by transparent cover sheets 20 and 30. The disc is provided with a central opening 70. Each sheet is radially tensioned and sealed to spacers 40 or 50 and to a perimeter ring 60 at the inner and outer radii of the disc, respectively. Since the spacer thicknesses are larger than the height of the ring, the space under the cover sheet represents a frustum of a cone. Its volume is filled with air enclosed there during assembly of the disc.

As stated above, the barometric pressure of air under the cover sheet (equal to the air pressure in the clean room during assembly) and air surrounding the disc during drive operation may have different values. This will create some pressure differential for the air inside and outside the disc that will result in deflection of the cover sheet. Several graphs are shown in FIG. 3 illustrating the deformed cover sheet when the optical disc is placed at different altitudes. With increased altitudes above the sea level, the air pressure in the surrounding atmosphere is decreasing resulting in the cover sheet bulging. In such conditions, when the disc is used in the drive, the cover sheet may touch the objective lens of the optical head making reading or writing impossible. Similarly, at decreasing altitudes below the sea level, the air pressure of the surrounding atmosphere is increasing that deflects the cover sheet toward the substrate. If at high levels of pressure differentials the cover sheet touches the substrate, reading or writing becomes once again impossible. To avoid such catastrophic cases, the cover sheet deflection due to pressure differentials must be reduced or eliminated completely.

On top of that, when the disc is rotated in the optical drive, centrifugal forces will displace the air in the air space under the cover sheet toward the outside periphery of the disc. This will decrease the pressure of the entrapped air at the inner zone of the disc and increase the air pressure at the outer part of the disc. As a result, additional deflection of the cover sheet will occur transforming the latter into an S-shaped sheet. Such a case is illustrated in FIG. 4 where several graphs show the deflected shape of the cover sheet due to disc rotation at various angular velocities. With the increasing number of revolutions per minute (rpm) in disc rotation, the S-shaped cover sheet deflects at higher rates that may bring the cover sheet in contact with the substrate of the disc or the objective lens of the optical head.

Each graph in FIGS. 3 and 4 was derived by an experimentally verified mathematical model developed to describe the cover sheet behavior at different conditions. As seen here, graphs for deflected cover sheet due to disc rotation intersect the original cover sheet of a stationary disc at the same so-called inflection point where on one lateral side of the point the cover sheet will bulge and on the other lateral side it will be depressed. At the inflection point, no deflection of the cover sheet occurs since at that point the air pressure has the same value if measured outside and inside the disc. This phenomena is observed only when the disc operation takes place at any altitude but with the air pressure inside and outside the disc statically equalized before rotation starts.

With the deflected cover sheet due to static pressure differentials, avoiding catastrophic cases of drive operation when the sheet touches the substrate or the objective lens may be achieved by lowering the difference in pressure values of the air entrapped under the cover sheet during the disc assembly and air surrounding the disc when it is used at various altitudes. Additional means must be provided to decrease dynamic deflection of the cover sheet of the disc rotated in an optical drive.

SUMMARY OF THE INVENTION

It is an object of the present invention to provide optical discs with cover sheets wherein static and dynamic deflections are significantly decreased.

This object is achieved by an optical disc having a substrate in which data can be written on or read from, such optical disc being adapted to be inserted and clamped onto a spindle in a disc drive and having a transparent cover sheet disposed over the substrate surface, comprising:

a) such optical disc having a perimeter ring on the edge thereof and a spacer formed adjacent to a central opening in the disc;

b) a transparent cover sheet spaced from the substrate surface, the perimeter ring being formed with a plurality of air passages leading from the space between the transparent cover sheet and the substrate surface to the outside atmosphere and the spacer being formed with a plurality of air passages leading from the outside atmosphere to the space between the transparent cover sheet and the substrate surface;

c) filters provided in the air passages in the spacer and the perimeter ring to prevent contaminants from the atmosphere from entering into the space between the transparent cover sheet and the substrate surface; and d) whereby the transparent cover sheet is prevented from deflecting due to pressure differences between the outside atmosphere and the air in the space between the substrate surface and the transparent cover sheet and permitting a continuous flow of air through the air passages in the spacer to the space between the substrate surface and the transparent cover sheet and out through the air passages in the perimeter ring to the outside atmosphere when the optical disc is rotated.

The invention and its various advantages will become more evident to the skilled artisan from the ensuing description of preferred embodiments.

Advantages

It is an advantage of the present invention that the provision of the air passages in the spacer and the perimeter ring prevent the cover sheet from deflecting due to pressure differences between the outside atmosphere and the air in the space between the substrate surface and the transparent cover sheet. Furthermore, this arrangement permits a continuous flow of air through the air passages in the spacer to the space between the substrate surface and the transparent cover sheet and out through the air passages in the perimeter ring to the outside atmosphere when the optical disc is rotated. This arrangement prevents both static and dynamic deflection of the cover sheet.

DETAILED DESCRIPTION OF THE INVENTION

Figure 1:
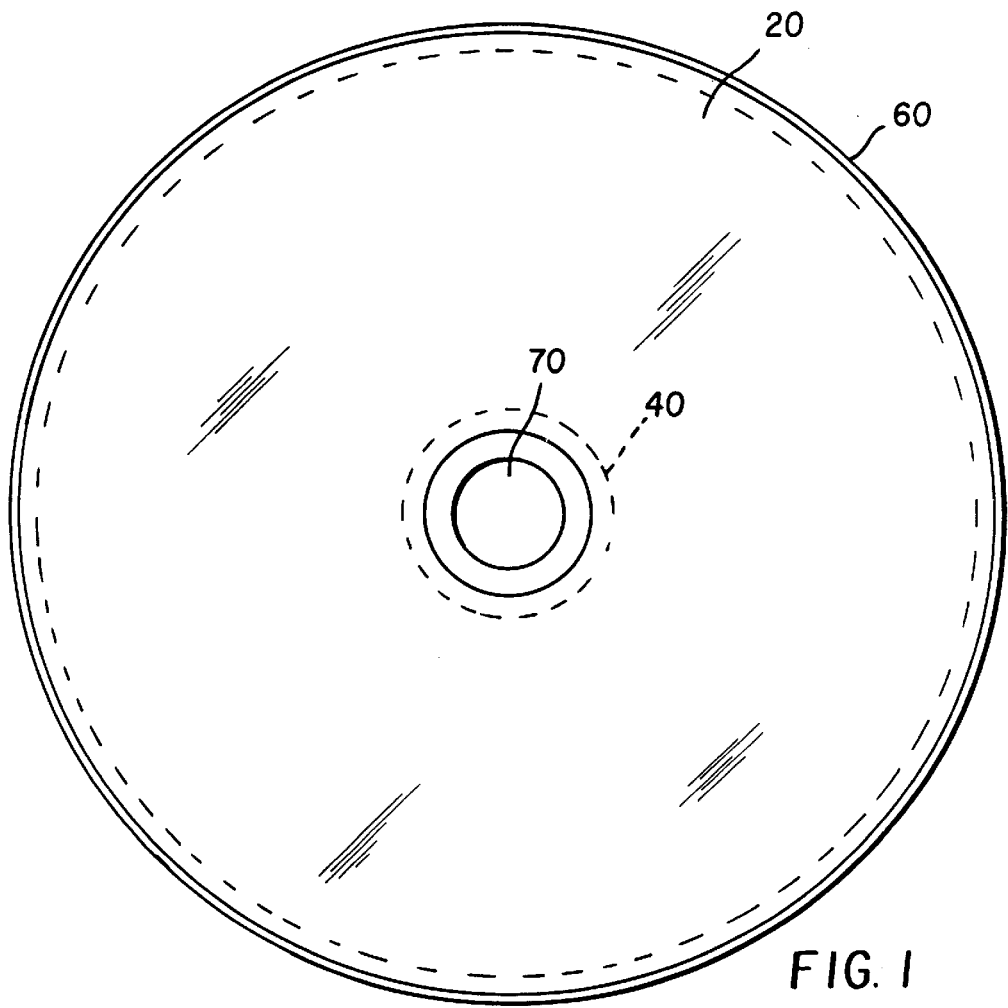
FIG. 1 is a top view of a an optical disc equipped with a cover sheet.
Figure 2:
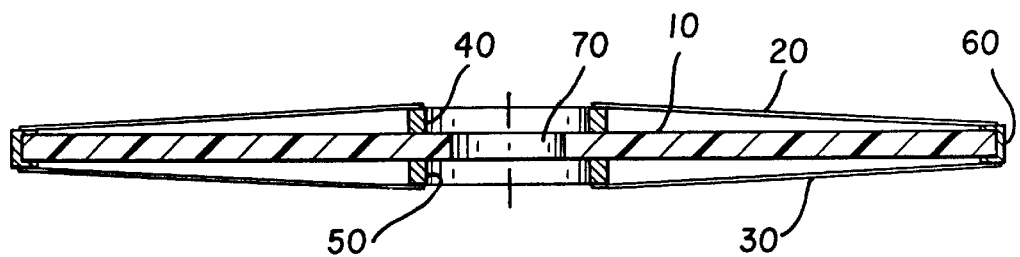
FIG. 2 is a radial cross section of the optical disc from FIG. 1.
Figure 3:
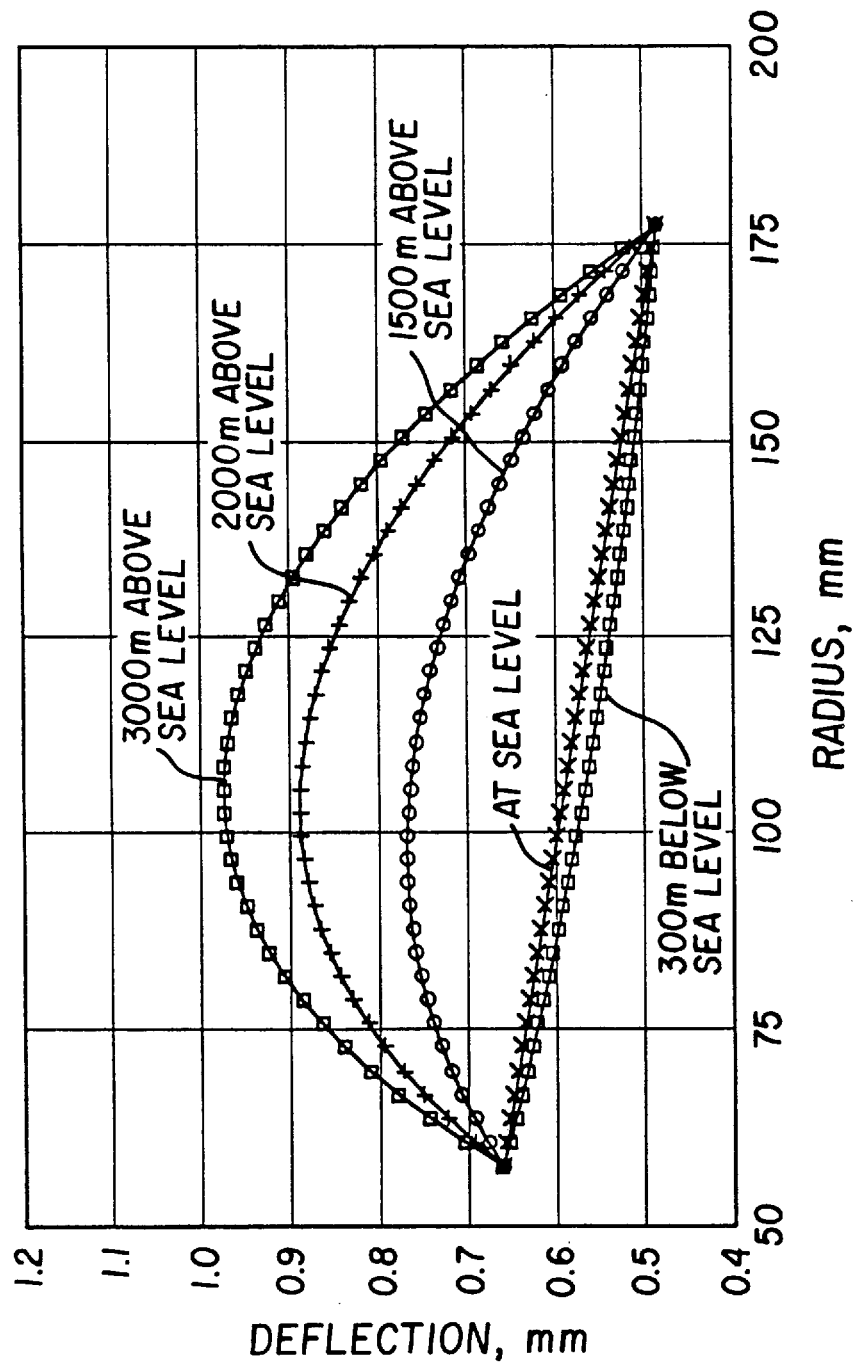
FIG. 3 is a plot of deflection vs. radius for the cover sheet of FIG. 1 showing deflection for the disc placed at different altitudes with changing air pressure of the surrounding atmosphere.
Figure 4:
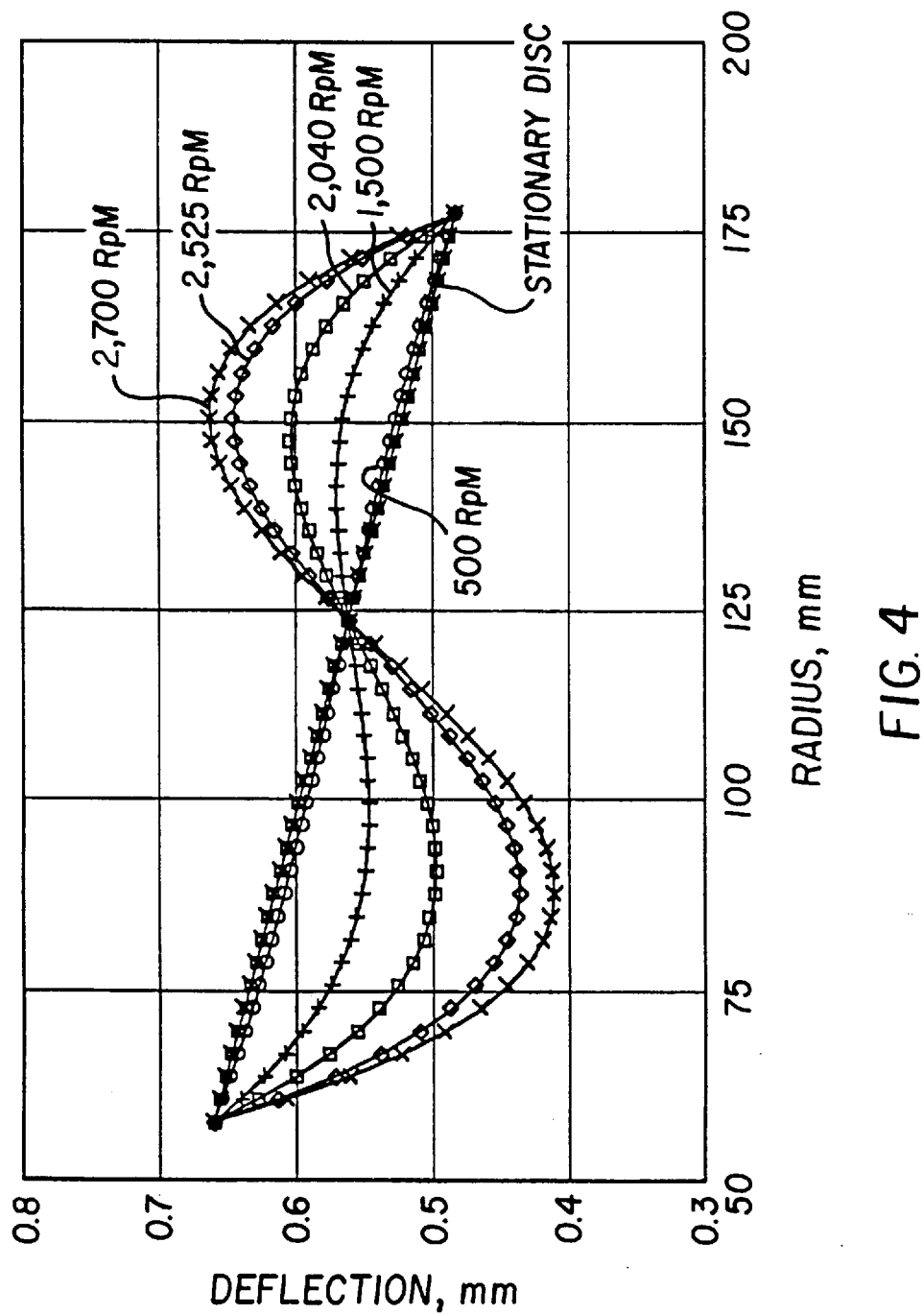
FIG. 4 depicts graphs of deflection vs. radius for a typical optical disc cover sheet showing that there is a point of inflection of the cover sheet when the cover sheet deflects during rotation of the disc and that this point is substantially the same irrespective of the rotational velocity of the disc.
Figure 5:
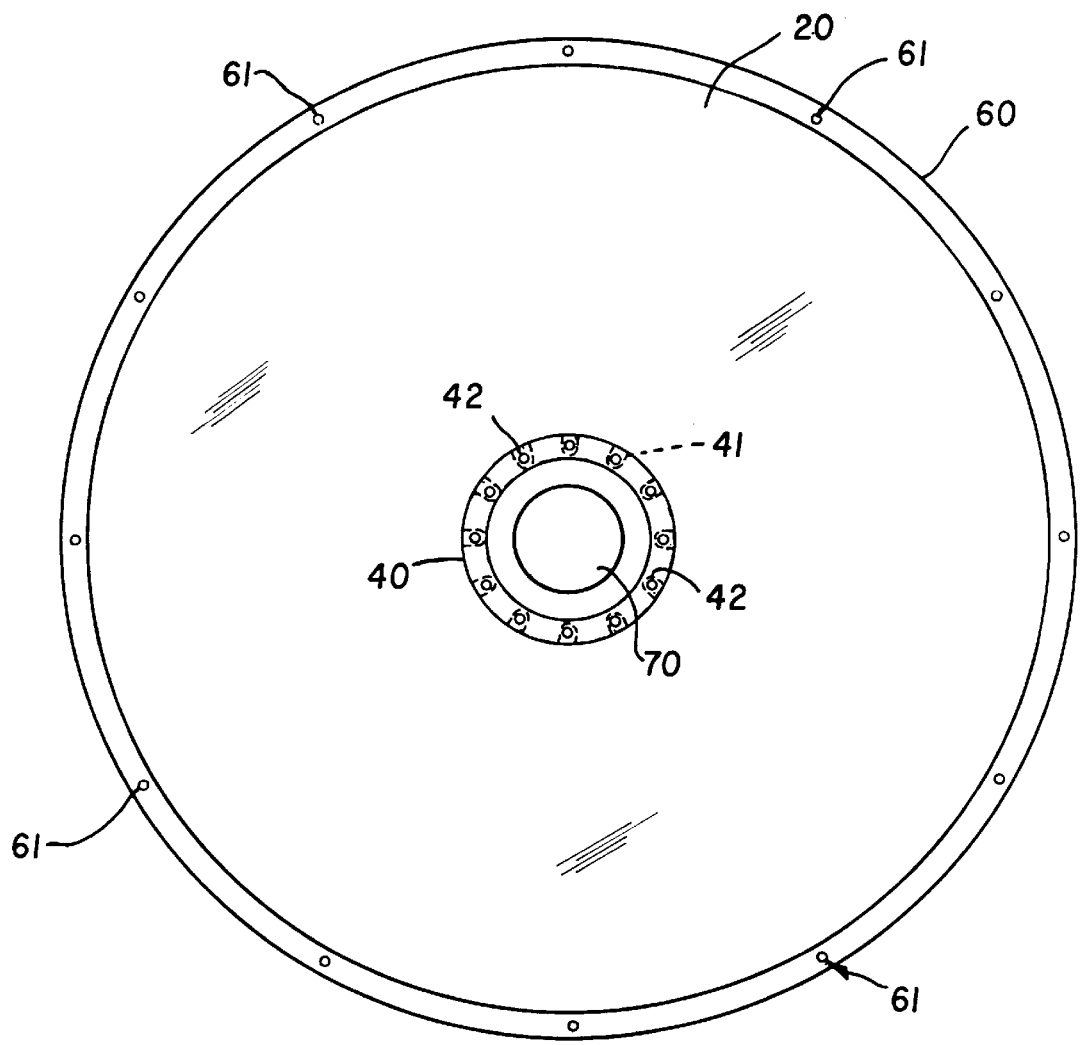
FIG. 5 is a top view of an optical disc similar to FIG. 1 but with plurality of openings in the cover sheet at the inner and outer radii of the disc that represents the preferred embodiment of the invention.
Figure 6:
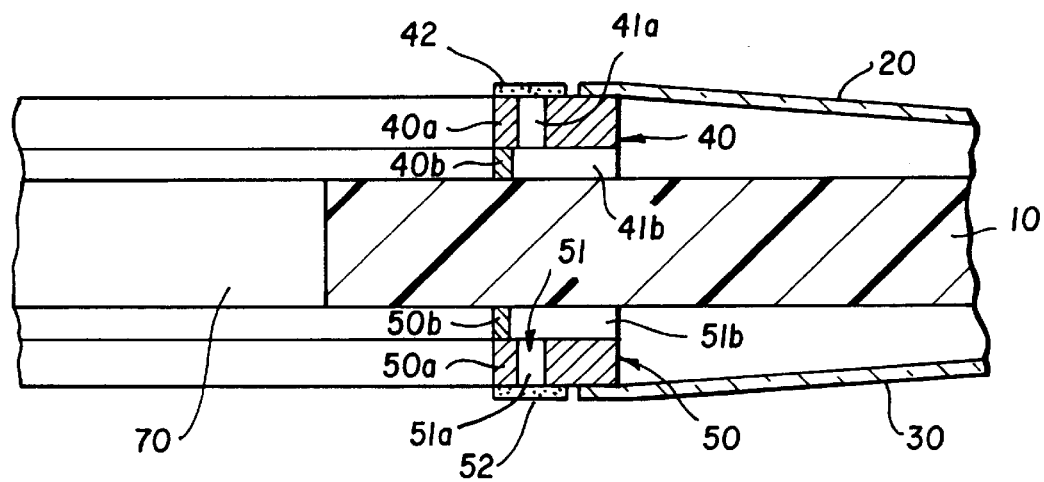
FIG. 6 is a partial radial cross section of the optical disc of FIG. 5.
Figure 7:
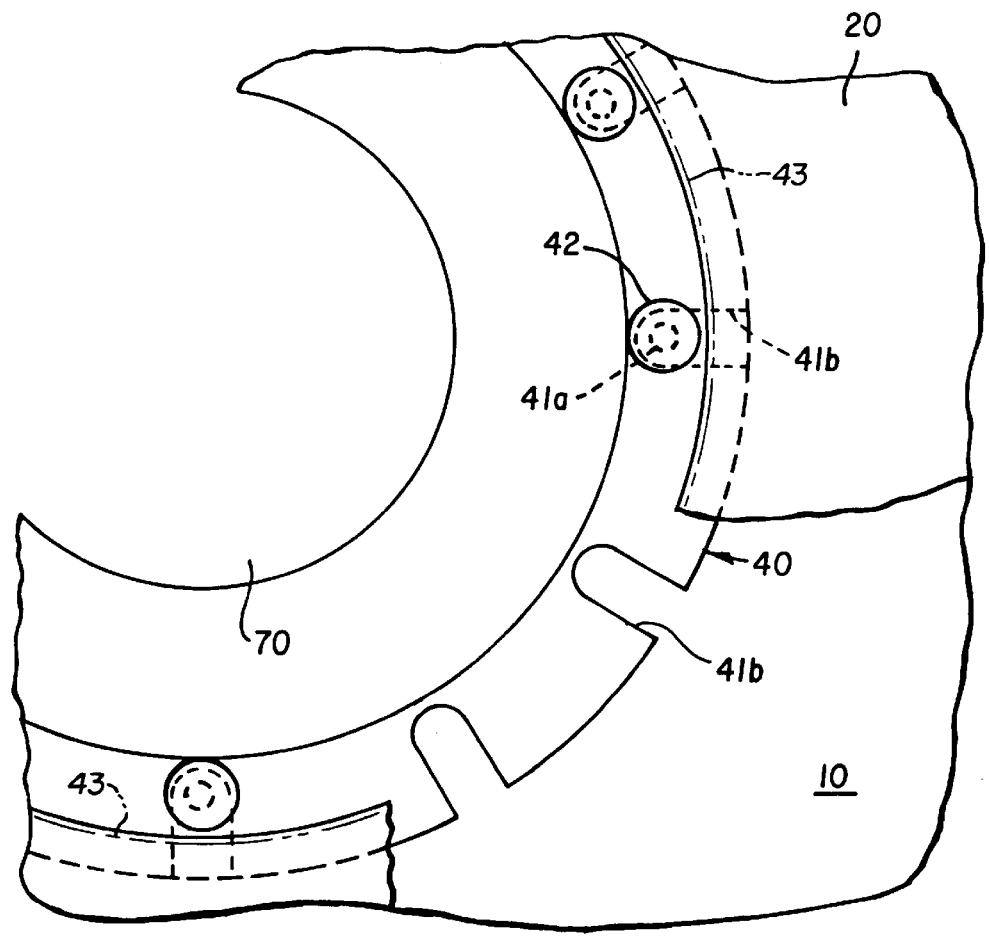
FIG. 7 is a partial top view of the optical disc of FIG. 6.

Turning now to FIG. 5, which shows an optical disc in accordance with the present invention, a plurality of "breathing" air passages 41 and 61 are respectively shown as being located around the center of the disc and at its periphery. Passages 41 are located in the top spacer 40 as illustrated in FIG. 6, which is an enlarged radial cross sectional view of the optical disc of FIG. 5. In FIG. 6, similar passages 51 in the bottom spacer 50 are also shown for the opposite side of the disc. Each of these passages combine holes 41a and 51a in the top elements 40a and 50a of each spacer and cutouts 41b and 51b in the bottom elements 40b and 50b of each spacer. Both holes 41a and cutouts 41b can be also seen in FIG. 7 which is a partial top view of the optical disc of FIG. 6. With the cover sheet 20 sealed to spacer 40 along a circular trace 43 (see FIG. 7), holes 41a and cutouts 41b connect the space under the cover sheet 20 with the atmosphere surrounding the disc. This permits an air passage either from the outside into the inside areas of the disc, or in the opposite direction, depending upon the differential pressure in those two areas. Such a passage will permit the air pressure inside and outside the disc to be statically equalized at any altitude. To protect the recording surface of the disc from any outside contamination, the "breathing" air passages 41 are covered with a continuous ring of filtering material or separate filters 42. Similar filters 52 are shown in FIG. 6 for the opposite side of the disc.

Figure 8:
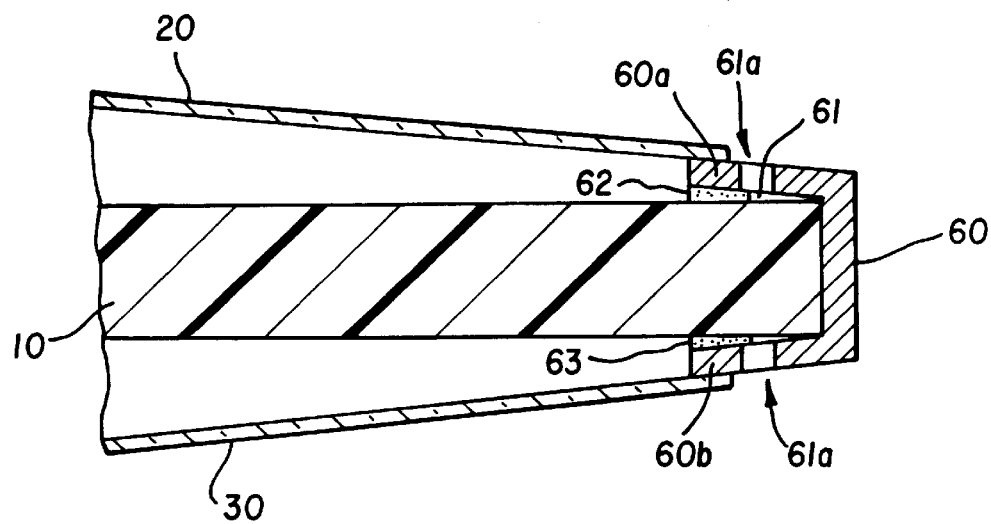
FIG. 8 is a partial radial cross section of the optical disc of FIG. 5.
Figure 9:
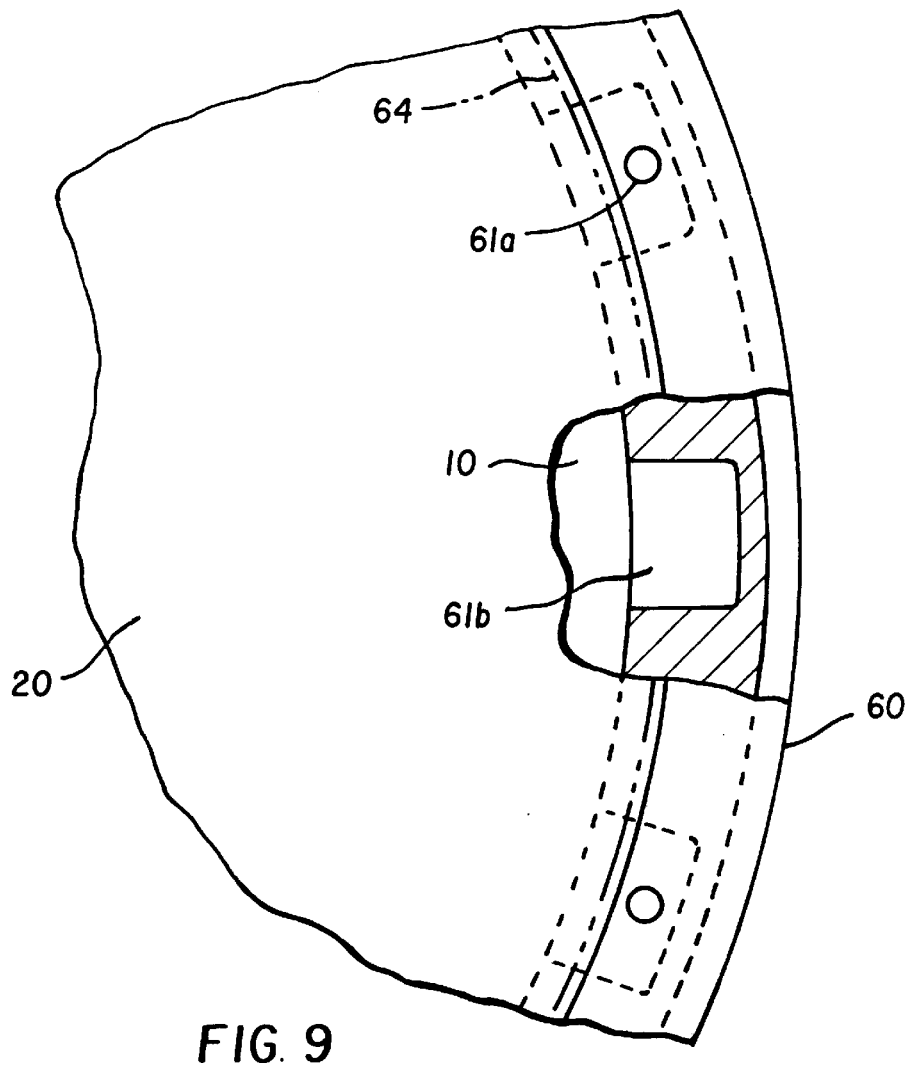
FIG. 9 is a partial top view of the optical disc of FIG. 8.

The second plurality of "breathing" air passages 61 at the outside periphery of the disc is shown in FIG. 8 which is an enlarged radial cross sectional view of the optical disk in FIG. 5. These passages are provided at each of the opposite sides of the optical disc. More particularly, the air passages 61 are disposed in the upper and lower portions 60a and 60b of the perimeter ring. As shown in FIG. 9, such passages combine holes 61a and local circular cutouts 61b to define the air passages 61. With the cover sheet 20 sealed to the ring 60 along a circular trace 64, "breathing" air passages 61 connect the space under the cover sheet 20 with the atmosphere outside the disc. This will permit the air to enter the space under the cover sheet through passages 41 and then flow freely into the surrounding atmosphere through passages 61. As a result, with a rotating disc, the air pressure under the cover sheet will be stabilized that will drastically reduce the cover sheet dynamic deflections. The recording surface of the disc is protected from any outside contamination by filters 62 and 63 located in cutouts 61b of passages 61.

Figure 10:
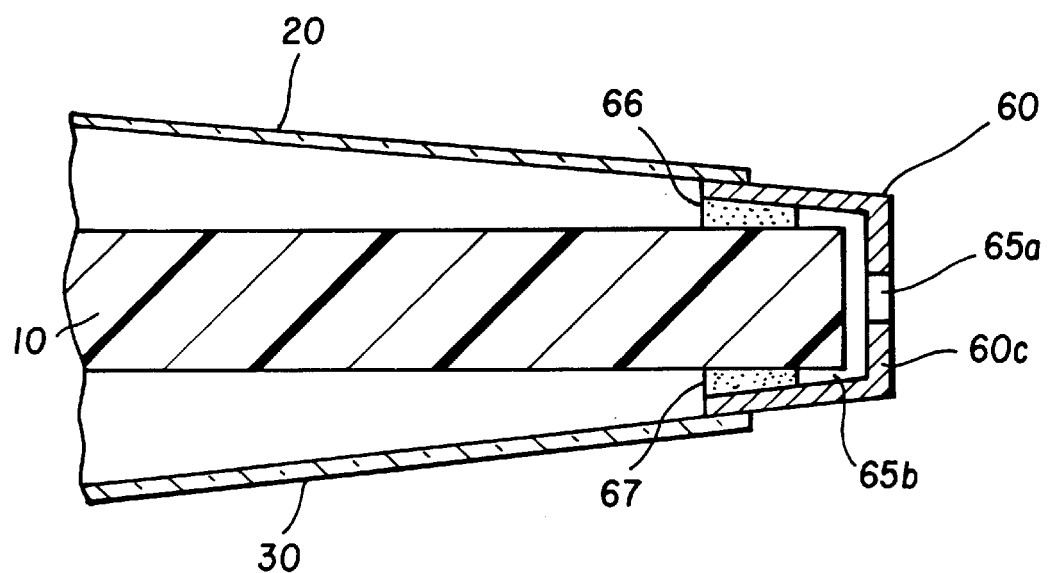
FIG. 10 is a partial radial cross section of the optical disc of FIG. 5 with details of a different embodiment.

Another embodiment of the invention is demonstrated in FIG. 10 where, similar to FIG. 8, holes 65a and cutouts 65b are located in the outside wall 60c of the perimeter ring 60. This results in a more efficient area utilization of the disc recording surface. Filters 66 and 67 are provided here to protect the disc from any outside contamination.

The invention has been described in details with particular reference to preferred embodiments thereof, but it will be understood that variations and modifications can be effected within the spirit and scope of the invention.

We claim:

1. An optical disc having a substrate in which data can be written on or read from, said optical disc being adapted to be inserted and clamped onto a spindle in a disc drive and having first and second transparent cover sheets disposed over upper and lower surfaces of the substrate, respectively, comprising:

a) said optical disc having a perimeter ring on an edge thereof and first and second spacers formed adjacent to a central opening in the optical disc;

b) said first and second transparent cover sheets spaced from the upper and lower surfaces of the substrate, respectively, the perimeter ring includes a plurality of upper and lower air passages, respectively formed in upper and lower portions of the perimeter ring, that respectively lead from upper and lower spaces, respectively located between the first transparent cover sheet and the upper surface of the substrate and between the second transparent cover sheet and the lower surface of the substrate, to the outside atmosphere, and the first and second spacers being formed with a plurality of air passages leading from the outside atmosphere to the upper and lower spaces, respectively;

c) filters provided across the air passages in the first and second spacer and the perimeter ring to prevent contaminants from the atmosphere from entering into the upper and lower spaces; and d) whereby the first and second transparent cover sheets are prevented from deflecting due to pressure differences between the outside atmosphere and the air in the upper and lower spaces by permitting a continuous flow of air through the air passages in the first and second spacers to the upper and lower spaces and out through the upper and lower air passages in the perimeter ring to the outside atmosphere when the optical disc is rotated.

2. The optical disc of claim 1 wherein the first and second transparent cover sheets are is connected to the first and second spacers, respectively, and to the perimeter ring.

* * * * *